United States Patent [19]
Willey

[11] Patent Number: 6,104,927
[45] Date of Patent: Aug. 15, 2000

[54] COMMUNICATION SYSTEM, MOBILE STATION, AND METHOD FOR MOBILE STATION REGISTRATION

[75] Inventor: William Daniel Willey, Arlington Heights, Ill.

[73] Assignee: Motorola, Inc., Schaumburg, Ill.

[21] Appl. No.: 09/086,227

[22] Filed: May 28, 1998

[51] Int. Cl.[7] .................................................. H04Q 7/00
[52] U.S. Cl. ........................... 455/435; 455/442; 455/456
[58] Field of Search .................................. 455/31.1, 502, 455/435, 432, 517, 524, 456, 442; 370/332

[56] References Cited

U.S. PATENT DOCUMENTS

| | | | |
|---|---|---|---|
| 5,267,261 | 11/1993 | Blakeney, II et al. | 370/332 |
| 5,289,527 | 2/1994 | Tiedemann, Jr. | 455/435 |
| 5,361,396 | 11/1994 | Onoe et al. | 455/435 |
| 5,475,862 | 12/1995 | Sawyer | 455/33.1 |
| 5,621,784 | 4/1997 | Tiedemann, Jr. et al. | 379/59 |
| 5,854,785 | 12/1998 | Willey | 370/332 |
| 5,907,813 | 5/1999 | Johnson, Jr. et al. | 455/502 |

*Primary Examiner*—Fan Tsang
*Assistant Examiner*—Isaak R. Jama
*Attorney, Agent, or Firm*—John B. Mcintyre; Mario J. Donato, Jr.

[57] ABSTRACT

A method and system are disclosed where both a mobile station (105) and the infrastructure logically treat all access probes of an access attempt as if they were transmitted to a first base station (101). This is accomplished by having the mobile station (105) store both the registration parameters received from the first base station (101) to which an access probe is transmitted and a characteristic, such as the PN offset, of the first base station (101). When the mobile station (105) determines that it should perform an access probe handoff, it transmits an access probe to a different base station, identifying in the probe the characteristic, such as the PN offset, of the first base station (101). This allows the infrastructure to identify the base station that the mobile station (105) intends to register with. When the mobile station (105) receives acknowledgment to the access attempt, it then updates its registration variables with respect to the parameters received from the first base station (101).

18 Claims, 3 Drawing Sheets

COMMUNICATION SYSTEM, MOBILE STATION, AND METHOD FOR MOBILE STATION REGISTRATION

FIELD OF THE INVENTION

The present invention relates generally to communication systems, and more particularly to methods for registering mobile stations in communication systems.

BACKGROUND OF THE INVENTION

Communication systems compatible with TIA/EIA/IS-95-A, *Mobile Station-Base Station Compatibility Standard for Dual Mode Wideband Spread Spectrum Cellular System*, March 1995, published by the Electronic Industries Association (EIA), 2001 Eye Street, N.W., Washington, D.C. 20006, better known simply as IS-95, are well known. Recently, a feature has been included into IS-95-B, the next revision of the standard, which allows a mobile station to perform a handoff of the paging and access channel if it fails to receive an acknowledgment to access probes sent on an access channel. For example, the mobile station could begin sending access probes for a message on one access channel and then handoff to another paging/access channel to continue sending access probes of the message. The mobile station would then end the access attempt upon receiving an acknowledgment on the other paging channel. In IS-95-B, this feature is referred to as "access probe handoff."

One problem in adding this sort of handoff to IS-95-A is that, when using IS-95-A access channel messages to perform registration, it is not possible for the mobile station and base station to maintain synchronized registration variables. For example, a mobile station could begin sending a Registration Message to base station A in registration zone A, fail to receive acknowledgment to the message from base station A, perform a paging/access channel handoff to base station B in registration zone B, continue sending the message to base station B, and receive acknowledgment from base station B. (It should be noted that base station B may not have even received the access probe; the layer 2 (L2) acknowledgment on base station B could be "piggybacked" on another layer 3 (L3) message sent via both base stations A and B using the "access handoff" feature which has been included in IS-95B).

According to IS-95-A, the registration zone (as well as other registration variables, such as those for distance-based registration) in which the mobile station intended to register is implied to the infrastructure from the base station which received the access channel message. Because the mobile station cannot determine which base stations received the Registration Message, and because the infrastructure does not know where the mobile station intended to register, it is unclear to both the mobile station and the infrastructure how the registration variables should be updated. This same problem exists when implicit registration is performed in conjunction with "access probe handoff" using the Origination Message or the Page Response Message.

Thus, a need exists for a method and apparatus which overcomes the deficiencies of the prior art.

DETAILED DESCRIPTION OF A PREFERRED EMBODIMENT

To overcome the deficiencies of the prior art, both the mobile station and the infrastructure "logically" treat all access probes of an access attempt as if they were transmitted to a first base station. This is accomplished by having the mobile station store both the registration parameters received from a first base station to which an access probe is transmitted and a characteristic of a first base station, such as the PN offset of the first base station. When the mobile station determines that it should perform an access probe handoff, it transmits an access probe to a different base station, identifying in the access probe the characteristic, such as the PN offset, of the first base station. This allows the infrastructure to identify the base station that the mobile station intends to register with. When the mobile station receives acknowledgment of the access attempt, it then updates its registration variables with respect to the parameters received from the first base station.

Figure 1:
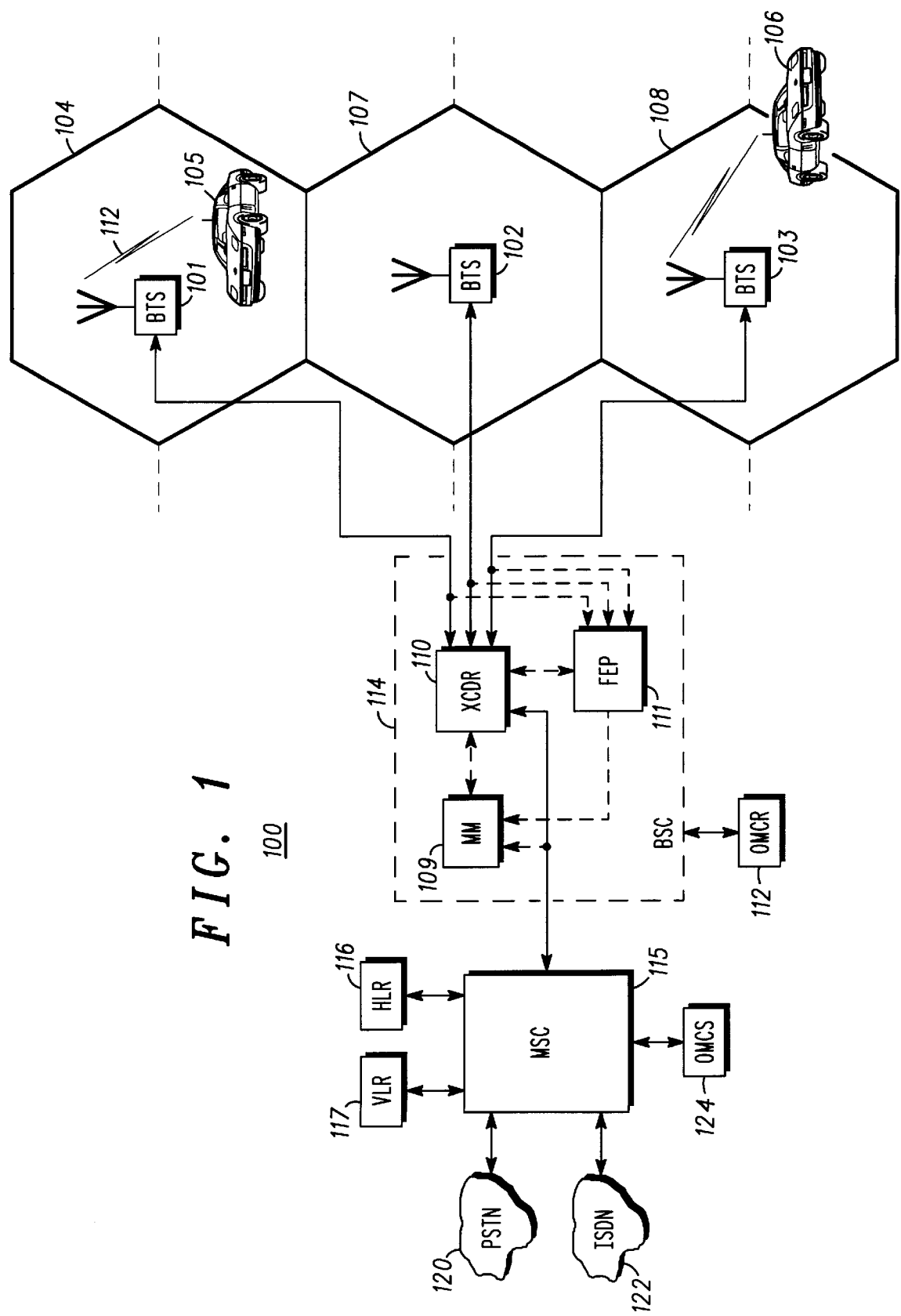
FIG. 1 depicts a communication system in accordance with the preferred embodiment of the present invention.

Referring now to FIG. 1, a CDMA communication system 100 which may beneficially employ registering mobile stations in conjunction with access channel handoffs in accordance with the invention is depicted. Referring to FIG. 1, acronyms are used for convenience. The following is a list of the acronyms used in FIG. 1:

| | |
|---|---|
| BTS | Base Transceiver Station |
| BSC | Base Station Controller |
| FEP | Front End Processor |
| VLR | Visitor Location Register |
| HLR | Home Location Register |
| ISDN | Integrated Services Digital Network |
| MS | Mobile Station |
| MSC | Mobile Switching Center |
| MM | Mobility Manager |
| OMCR | Operations and Maintenance Center - Radio |
| OMCS | Operations and Maintenance Center - Switch |
| PSTN | Public Switched Telephone Network |
| XCDR | Transcoder |

A first base station 101 is located in a first coverage area 104 and communicates with a mobile station 105. Communication is via a digital radio channel 112 which contains data information compatible with a CDMA communication system as defined in TIA/EIA-95-B, commonly referred to as IS-95-B, also known as TIA/EIA/SP-3693. As stated above, mobile station 105 is compatible with IS-95-B.

Also included in FIG. 1 are base stations 102 and 103 located within corresponding coverage areas 107 and 108, respectively. Each base station 101–103 is coupled to a base station controller (BSC) 114 which includes an FEP 111, an XCDR 110 and an MM 109. Each base transceiver station 101–103 has a Pseudo Noise (PN) offset associated therewith to uniquely identify the base station, as is known in the art. As shown in FIG. 1, the dotted lines within BSC 114 represent control information paths while the solid lines within BSC 114 represent speech information paths. As is clear from FIG. 1, XCDR 110 routes the speech information to and from the base stations 101–103 and has control information paths with MM 109 and FEP 111. The speech information is routed to an MSC 115 which provides switching functions for access to PSTN 120 or ISDN 122. HLR 116 and VLR 117 provide location and billing services for the entire system as is well known in the art, while OMCS 124 and OMCR 112 provide diagnostics and maintenance services for the entire system, as is also well known in the art.

As stated above, problems can occur when mobile station 105 attempts to access communication system 100. Mobile station 105 can attempt to access communication system 100 during a registration, an origination, or upon a page response. For example, if mobile station 105 attempts to transmit access probes of a registration to first base station 101 (typically because first base station 101 provides the best quality of service), and no acknowledgment is received from first base station 101, mobile station 105 then transmits one or more access probes of a registration to a second base station 102. If acknowledgment is received from second base station 102, this presents the situation where mobile station 105 should be registered in coverage area 104 (corresponding to first base station 101), but is now registered in coverage area 107, since an access with the second base station 102 has occurred.

Assuming that base station 101 received an access probe from the mobile station and that base station 102 did not receive an access probe from mobile station 105, the infrastructure thinks that mobile station 105 is registered in coverage area 104. As used herein, the term infrastructure refers to cellular equipment used to process calls, messaging, voice, data, and control information, and typically includes, for example, base stations, base station controllers, mobile switching centers, and transcoders, and is typically connected to a PSTN. Because mobile station 105 believes that it is registered in coverage area 107 and the infrastructure believes that mobile station 105 is registered in coverage area 104, a situation is created where mobile station 105 could miss pages (and thus miss a telephone call) because the infrastructure may not transmit pages directly to mobile station 105 over the base station that mobile station 105 receives in the idle mode.

Mobile station 105 preferably includes a receiver, a transmitter, a processor, and memory. The receiver receives registration parameters from first base station 101 and acknowledgments from second base station 102. The transmitter transmits access probes to first base station 101 and second base station 102. The processor updates registration variables pertaining to mobile station 105 based at least in part upon the registration parameters. The memory stores a characteristic associated with first base station 101, such as the Pseudo Noise (PN) offset, and the registration variables.

Figure 2:
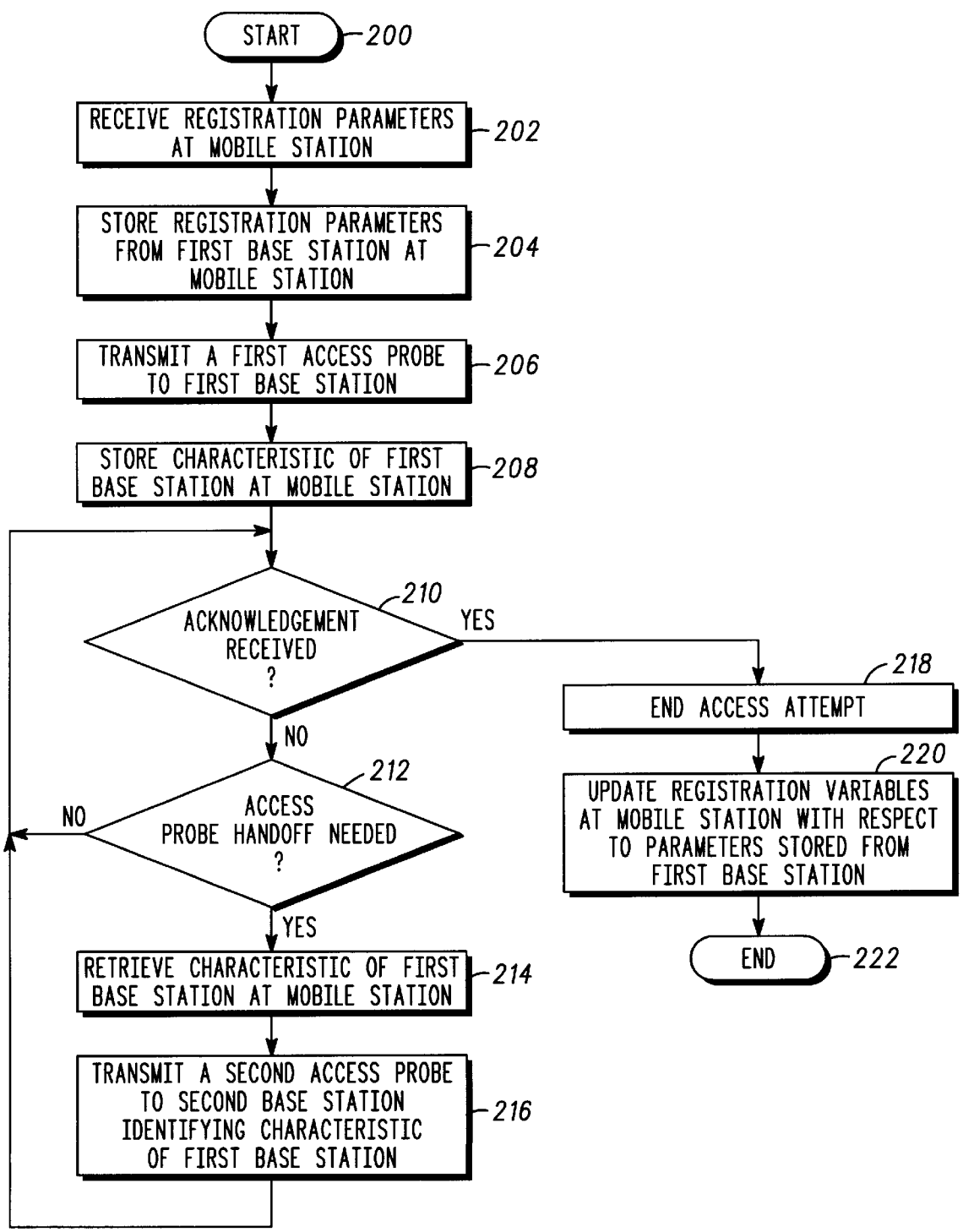
FIG. 2 depicts a flow diagram for mobile station processing of a mobile station registration in accordance with the preferred embodiment of the present invention.

FIG. 2 depicts a flow chart describing the process that mobile station 105 undergoes in accordance with the present invention. The process starts at 200 and flows to step 202 where registration parameters are received at mobile station 105. In the preferred embodiment of the present invention, the registration parameters include the latitude, longitude, and registration distance associated with first base station 101, as well as a registration zone number associated with first base station 101. Next, the registration parameters received at mobile station 105 (from the first base station 101) are stored at mobile station 105. A first access probe is then transmitted to the first base station 101 at step 206 while mobile station 105 stores the characteristic, such as the pseudo-noise (PN) offset, associated with first base station 101 at step 208. If an acknowledgment is received at step 210, the process flows through to steps 218, 220 and 222.

Mobile station 105 ends the access attempt at step 218 if an acknowledgment has been received. This is preferably accomplished by ceasing transmission of the access probes. Mobile station 105 then updates the registration variables at mobile station 105 at step 220. The registration variables are updated with respect to parameters stored from first base station 101. The process then ends at step 222.

However, if an acknowledgment is not received at step 210, the process flows to step 212 where a test is performed to determine whether an access probe handoff is required. If the result of this test is negative, the process flows to step 210 where the process continues. If the result of this test is positive, the process flows to step 214 where mobile station 105 retrieves the characteristic, such as the PN offset, associated with the first base station 101. Next, at step 216, mobile station 105 transmits a second access probe which identifies the PN offset of first base station 101 to a second base station 102. This can be accomplished by sending the characteristic associated with first base station 101 within the second access probe to second base station 102. Examples of such characteristics associated with first base station 101 include the PN offset of first base station 101, the frequency at which first base station 101 transmits, the modulation of first base station 101, the code channel, or the time slot associated with first base station 101. The process then flows to step 210 to continue to wait for an acknowledgment from either first base station 101 or second base station 102.

Figure 3:
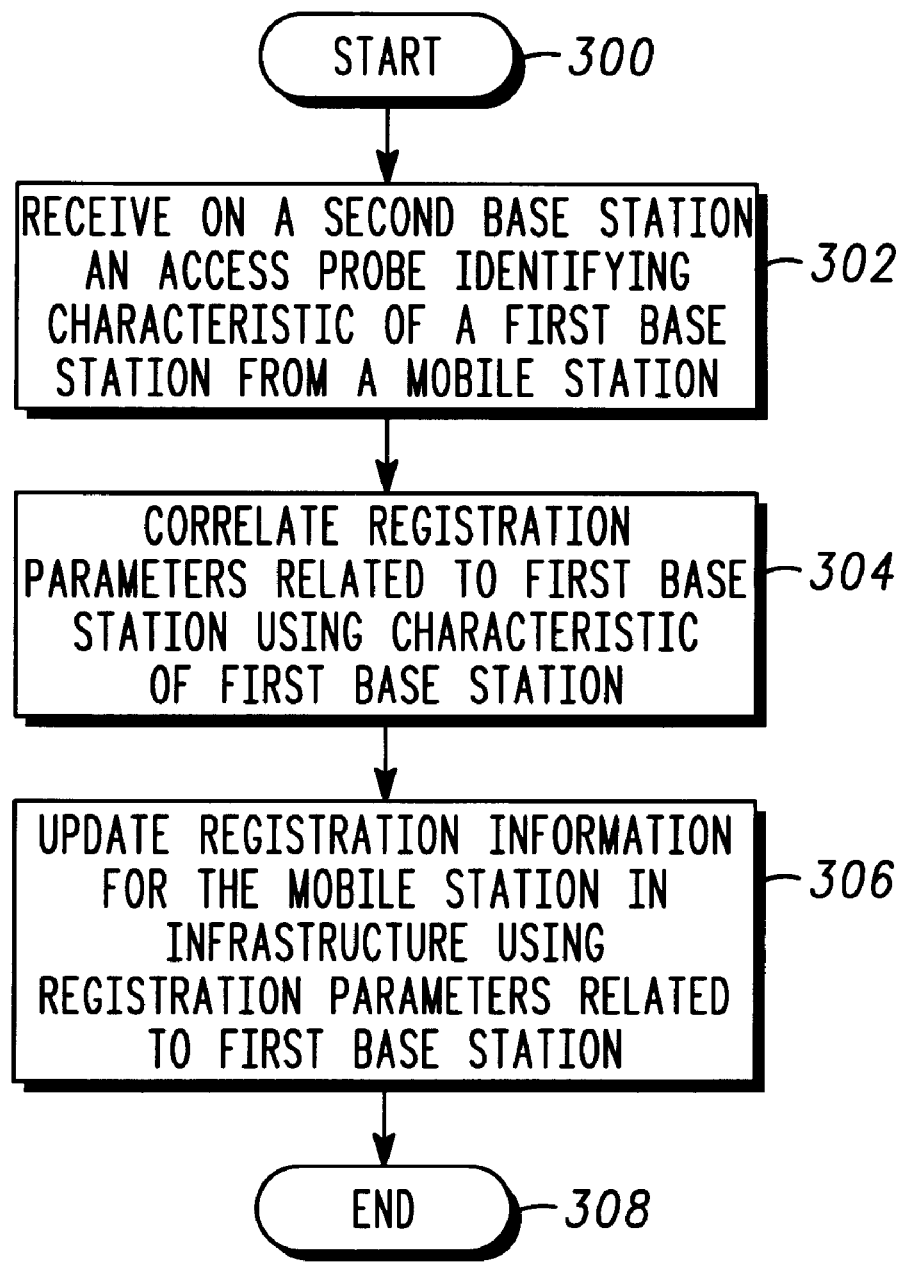
FIG. 3 depicts a flow diagram for infrastructure processing of a mobile station registration in accordance with the preferred embodiment of the present invention.

FIG. 3 generally depicts a flow chart describing the process the network or infrastructure side of communication system 100 performs in accordance with the present invention. The process starts at step 300 and flows to step 302 where second base station 102 receives the second access probe identifying a characteristic of first base station 101, preferably the PN offset of first base station 101. Next, at step 304, the infrastructure correlates registration parameters related to the first base station 101 using the characteristic associated with first base station 101. The infrastructure preferably correlates registration parameters by retrieving the latitude of the first base station, the longitude of the first base station, the registration distance associated with the first base station, and a registration zone number associated with the first base station. Finally, the registration information for mobile station 105 within the infrastructure is updated using the registration parameters related to first base station 101 at step 306. The infrastructure can also utilize the registration information to determine a plurality of base stations to transmit a paging message directed to the mobile station. The process the ends at step 308.

By implementing the method in accordance with the present invention, registration information within the infrastructure equipment is accurately updated based on the base station (in this case, first base station 101) in which mobile station 105 intended to access and not based on which base station mobile station 105 actually accessed. This method of access leads to higher system reliability, fewer missed calls and more efficient registration of mobile stations.

While this invention has been described in terms of certain examples thereof, it is not intended that it be limited to the above description, but rather only to the extent set forth in the claims that follow.

I claim:

1. A method for updating registration information for a mobile station in a communication system, the method comprising:

receiving at a second base station a message used for registration from a mobile station;

identifying a characteristic of a first base station based at least in part upon the message used for registration;

correlating registration parameters related to the first base station using the characteristic of the first base station; and updating registration information for the mobile station using registration parameters related to the first base station, the first base station and the second base station being involved in the same registration.

2. A method for updating registration information in accordance with claim 1, wherein the step of identifying a characteristic of a first base station comprises the step of identifying a Pseudo Noise (PN) offset of the first base station.

3. A method for updating registration information in accordance with claim 1, wherein the step of correlating registration parameters related to the first base station comprises the step of retrieving the latitude of the first base station.

4. A method for updating registration information in accordance with claim 1, wherein the step of correlating registration parameters related to the first base station comprises the step of retrieving the longitude of the first base station.

5. A method for updating registration information in accordance with claim 1, wherein the step of correlating registration parameters related to the first base station comprises the step of retrieving a registration distance of the first base station.

6. A method for updating registration information in accordance with claim 1, wherein the step of correlating registration parameters related to the first base station comprises the step of retrieving a registration zone number associated with the first base station.

7. A method for updating registration information in accordance with claim 1, further comprising the step of utilizing the registration information to determine a plurality of base stations to transmit a paging message directed to the mobile station.

8. A method for mobile station registration comprising:

receiving registration parameters from a first base station at a mobile station;

storing the registration parameters from the first base station at the mobile station;

transmitting a first message used for registration from the mobile station to the first base station;

receiving a characteristic associated with the first base station at the mobile station;

transmitting a second message used for registration to a second base station, the second message used for registration identifying the characteristic associated with the first base station; and updating registration variables at the mobile station based upon the stored registration parameters associated with the first base station, the first base station and the second base station being involved in the same registration.

9. A method for mobile station registration in accordance with claim 8, wherein the step of receiving a characteristic associated with the first base station comprises the step of receiving a Pseudo Noise (PN) offset associated with the first base station.

10. A method for mobile station registration in accordance with claim 9, wherein the step of receiving a Pseudo Noise (PN) offset associated with the first base station comprises the step of receiving the Pseudo Noise (PN) offset associated with the first base station from the first base station.

11. A method for mobile station registration in accordance with claim 8, wherein the step of updating registration variables is performed when an acknowledgment is received from the second base station.

12. A method for mobile station registration in accordance with claim 8, wherein the step of receiving registration parameters at the mobile station comprises the step of receiving the latitude of the first base station.

13. A method for mobile station registration in accordance with claim 8, wherein the step of receiving registration parameters at the mobile station comprises the step of receiving the longitude of the first base station.

14. A method for mobile station registration in accordance with claim 8, wherein the step of receiving registration parameters at the mobile station comprises the step of receiving the registration distance of the first base station.

15. A method for mobile station registration in accordance with claim 8, wherein the step of receiving registration parameters at the mobile station comprises the step of receiving a registration zone number associated with the first base station.

16. A method for mobile station registration in accordance with claim 8, wherein the step of transmitting a second access probe to a second base station comprises the step of transmitting a second access probe to a second base station from the mobile station.

17. A communication system comprising:

a first base station having a first Pseudo Noise (PN) offset associated therewith, the first base station adapted to receive a first message used for registration on an access channel from a mobile station; and a second base station adapted to receive a second message used for registration on an access channel from the mobile station, the second message used for registration identifying the PN offset associated with the first base station.

18. A mobile station comprising:

a receiver adapted to receive registration parameters from a first base station and acknowledgments from a second base station, the registration parameters and the acknowledgements being involved in the same registration;

a transmitter adapted to transmit registration messages to the first base station and the second base station;

a processor for updating registration variables pertaining to the mobile station based at least in part upon the registration parameters; and memory for storing a Pseudo Noise (PN) offset associated with the first base station and the registration variables.

* * * * *